Patented Oct. 12, 1948

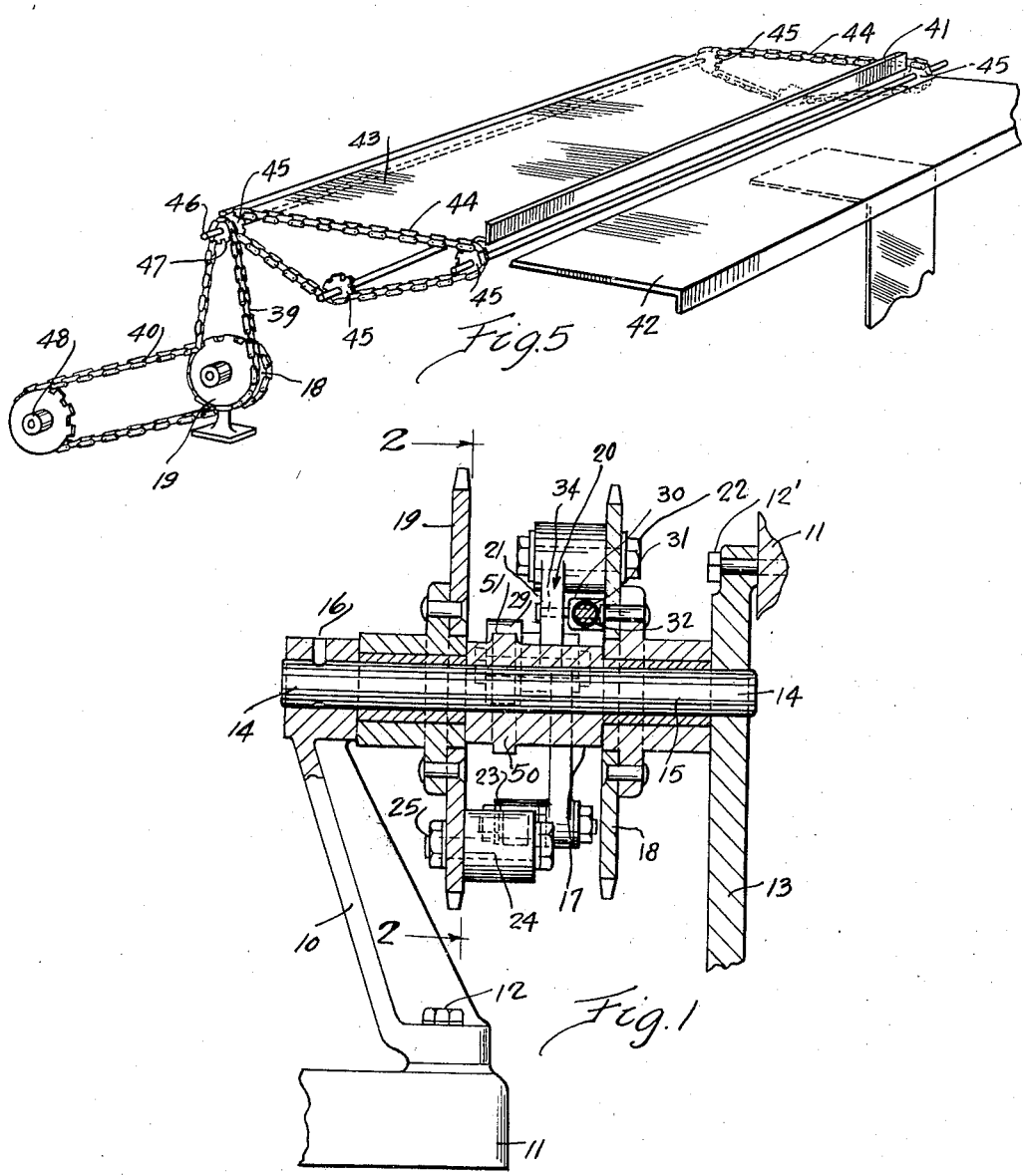

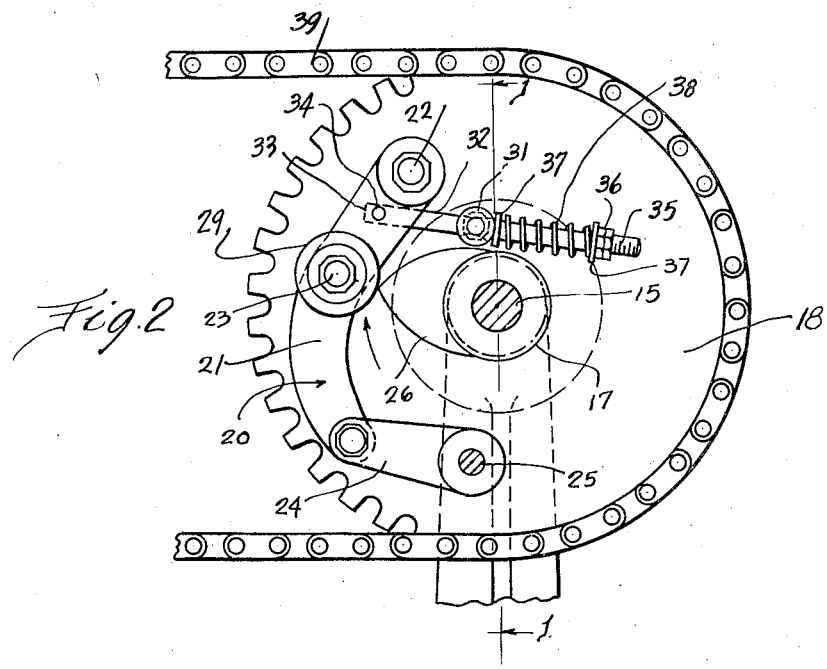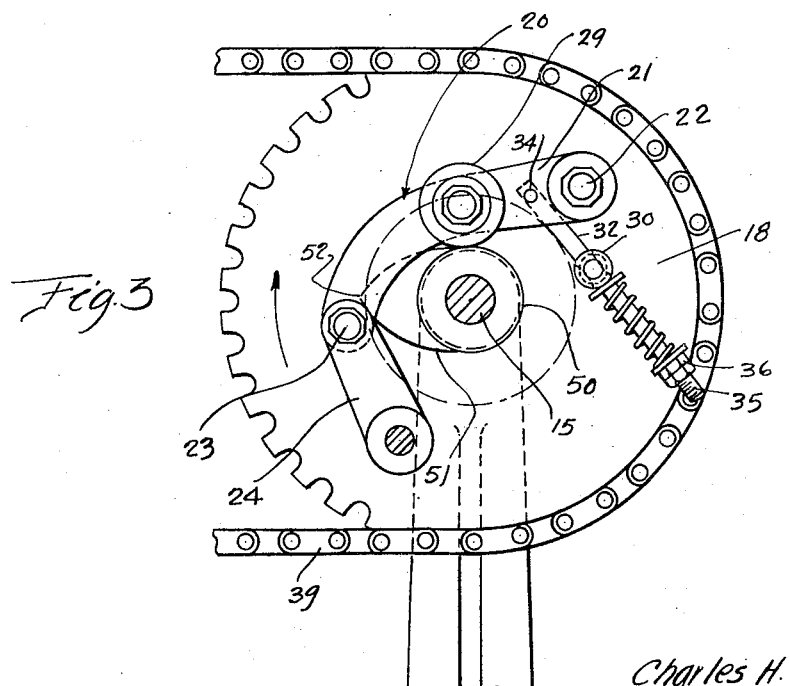

2,451,303

UNITED STATES PATENT OFFICE 2,451,303

MECHANICAL MOVEMENT

Charles H. Petskeyes, Davenport, Iowa, assignor to Gellman Manufacturing Company, Rock Island, Ill., a corporation of Illinois Application June 9, 1945, Serial No. 598,464

6 Claims. (Cl. 74—63)

This invention relates to certain new and useful improvements in a mechanical movement. More specifically, the invention relates to a mechanism in which there is a driven gear and a driving gear and an arrangement whereby the driven gear will be accelerated with respect to the driving gear and the driven gear will be decelerated, or idle, to provide a period of dwell for a member movable by the mechanism.

In this aspect of the invention, a principal object is to accomplish the above stated results by a mechanism which will be simple in construction, highly efficient in use, and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a vertical sectional detail view of the invention taken substantially on line 1—1 of Fig. 2;

Fig. 2 is a detail view taken substantially on line 2—2 of Fig. 1;

Fig. 3 is a detail view similar to Fig. 2 but showing the parts thereof in different position with respect to each other;

Fig. 4 is an illustration in graph form of a relative position between two members embodied in the invention;

Fig. 5 is a perspective view illustrating one application of the invention.

The drawings illustrate the preferred form of construction by which the several objects of my invention are accomplished.

In this connection a mounting bracket is indicated at 10, and this bracket is secured to a frame or stationary support 11 of the device with which the invention is associated. This connection is accomplished in the present instance through the medium of suitable bolts 12. A bearing plate is indicated at 13, and this plate is likewise secured to the frame 11 by means of bolts 12'. The bearing plate 13 and mounting bracket 10 are substantially spaced from each other in the manner shown in Fig. 1. Journaled in the bearing plate and the mounting bracket 10 are the end portions 14 of a shaft 15. The shaft 15 is secured, in the present instance, to the mounting bracket by a set screw 16, whereby the shaft 15 is held against rotation.

Fixed to this shaft 15 in any suitable manner and held thereby against rotation, is a sleeve 17. Disposed between this sleeve 17 and the bearing plate 13 is a gear 18, hereinafter referred to as the driver gear. Disposed between the sleeve 17 and the mounting bracket 10 is a gear 19 hereinafter referred to as the driven gear. Both the driver gear 18 and the driven gear 19 are mounted for rotation upon the shaft 15. The gears 18 and 19 are connected together by a toggle structure 20 including a link 21 having one end portion connected as at 22 to the driver gear 18. The opposite end portion of this link 21 is pivotally connected as at 23 to the other link 24 of the toggle structure 20, and this link 24 is pivotally connected as at 25 to the driven gear 19.

Preferably, though not necessarily, formed as an integral part of the sleeve 17 is a cam 26 and adapted to engage this cam 26 is a roller 29 carried by the link 21.

The gear 18 carries a swivel block 30 and projected through an opening 31 formed in this block 30 is the shank of a rod 32, one end portion 33 of which is pivotally connected as at 34 to the link 21. The opposite end portion of the rod 32 is threaded as at 35 and mounted on this are elements 36. On this rod 32, between the swivel block 30 and the nut elements 36, are washers 37. Disposed between these washers 37 and embracing the rod 32 are expansion springs 38. The gears 18 and 19 in the present instance are sprocket gears adapted to have operative engagement with sprocket chains 39 and 40.

In Fig. 5, I have illustrated one use to which my invention may be adapted. In this particular instance, it is desirable that a follower bar 41 momentarily remain idle to permit an elevator 42 to pass above a horizontal platform 43, from which platform the follower 41 is designed to convey an article onto the elevator 42. As shown, this follower 41 is supported by a pair of sprocket chains 44 which are passed over sprocket gears 45. On a shaft 46 carrying certain of the sprocket gears 45, there is a sprocket gear 47 which operatively engages the sprocket chain 39. The main drive gear is indicated at 48, and this drive gear 48 has operative connection with the sprocket chain 40.

The arrangement is such that upon rotation of the driver gear 18, rotation to the driven gear 19 will be imparted through the toggle structure 20. When the roller 29 moves over the lowest run 50 of the cam 26, the driven gear 19 and the driver gear 18 rotate together at the same speed of rotation. When, however, the roller starts to climb the high surface 51 of the cam (the driven gear rotating in the direction of the arrow shown in Fig. 3), the driven gear 19 will be accelerated as the roller 29 passes from the low point to the high point of the cam and the driven gear will decelerate, or idle, as the roller passes from the high point of the cam to the low point thereof. At this point of the operation, the follower bar 41 is in the position shown in Fig. 5, and the arrangement is such that this follower bar 41 will remain in this position until the elevator 42 is moved to a plane of the platform 43, at which time the roller 29 is about to start its movement from the high point 52 of the cam indicated at the low run 50 thereof, during which movement of the roller from this high point 52 to the low area the gears 18 and 19 again rotate substantially in unison with respect to each other.

In Fig. 4 I have carefully illustrated the operative relationship between the cam and the roller. In this illustration the full line indicates the driver gear 18. The dotted line indicates the driven gear 19. The run of the roller over the cam surface indicated at A, indicates the duration through which both gears 18 and 19 will rotate at the same speed of rotation; the run B indicates the climb of the roller from the low surface of the cam to the high surface thereof. During this movement of the roller upon the cam through this run B, the speed of rotation of the driven gear will be accelerated with reference to the speed of rotation of the driver gear until the roller reaches what I term the "hill" 53 of the cam, at which time, as the roller passes over this hill 53, the driven gear will momentarily idle as the driver gear continues to rotate. As soon as the roller has moved over the hill of the cam and starts its return to the low surface of the cam, which is through the run C (Fig. 4), the two gears 18 and 19 will again rotate simultaneously and at the same speed of rotation.

From the foregoing description, it is manifest that I provide a mechanical movement in which one of two rotatable members (one being driven by the other) is permitted for a predetermined period to idle while the other member continues to rotate. This, as is apparent from the foregoing description, is accomplished by a mechanism which is simple in construction and one which will be highly efficient in use and economical in manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a mechanical movement, the combination with a stationary shaft, of a driven member freely rotatable on the shaft, a driver member freely rotatable on the shaft, a cam fixed to said shaft means providing a connection between said members and including a cam engaging member adapted to engage said cam, said cam engaging member and said cam adapted to cooperate with each other whereby to advance said driven member with respect to said driver member as said cam engaging member passes from the low point to the high point of said cam and to provide a period of dwell for said driven member as said cam engaging member passes from the high point of said cam to the low point thereof.

2. In a mechanical movement, the combination with a stationary shaft, of a driven member freely rotatable on the shaft, a driver member freely rotatable on the shaft, a cam fixed to said shaft toggle means providing a connection between said members and including a cam engaging member adapted to engage said cam, said cam engaging member and said cam adapted to cooperate with each other whereby to advance said driven member with respect to said driver member as said cam engaging member passes from the low point to the high point of said cam and to provide a period of dwell for said driven member as said cam engaging member passes from the high point of said cam to the low point thereof.

3. In a mechanical movement, the combination with a stationary shaft, a driven member freely rotatable on the shaft, a driver member freely rotatable on the shaft, a flexible connection between said members, and means on said shaft and adapted to engage said connection whereby to accelerate said driven member with respect to said driver member and whereby there will be a period of dwell between the driven member and the driver member.

4. In a device of the class described, a bearing structure, a shaft mounted in said bearing structure, means fixedly connecting the shaft to the bearing structure, a pair of spaced gear members freely rotatable on the shaft, a bearing sleeve positioned between said gear members and fixed to said shaft, a cam member on said bearing sleeve, a toggle connecting the said gear members together, a roller carried by said toggle and adapted to operatively engage said cam member for the purposes substantially described.

5. In a mechanical movement, the combination with a stationary shaft, of a driven member freely rotatable on the shaft, a driver member freely rotatable on the shaft, a cam fixed to said shaft toggle means providing a connection between said members and including a cam engaging member adapted to engage said cam, said cam engaging member and said cam adapted to cooperate with each other whereby to advance said driven member with respect to said driver member as said cam engaging member passes from the low point to the high point of said cam and to provide a period of dwell for said driven member as said cam engaging member passes from the high point of said cam to the low point thereof, and spring means adapted to retard the movement of said toggle means.

6. In a device of the class described, a bearing structure, a shaft mounted in said bearing structure, means fixedly connecting the shaft to the bearing structure, a pair of spaced gear members freely rotatable on the shaft, a bearing sleeve positioned between said gear members and fixed to said shaft, a cam member on said bearing sleeve, a toggle connecting the said gear members together, a roller carried by said toggle and adapted to operatively engage said cam member for the purposes substantially described, and spring means adapted to retard the movement of said toggle.

CHARLES H. PETSKEYES.

REFERENCES CITED

The following references are of record in the file of this patent:

UNITED STATES PATENTS

| Number | Name | Date |
| --- | --- | --- |
| 2,336,361 | Lear | Dec. 7, 1943 |